(12) United States Patent
Benthien et al.

(10) Patent No.: US 9,386,825 B2
(45) Date of Patent: Jul. 12, 2016

(54) LOCALLY REINFORCED AIRCRAFT STRUCTURAL COMPONENT

(71) Applicant: Airbus Operations GmbH, Hamburg (DE)

(72) Inventors: Hermann Benthien, Hamburg (DE); Axel Soeffker, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/312,211

(22) Filed: Jun. 23, 2014

(65) Prior Publication Data

US 2014/0373315 A1 Dec. 25, 2014

(30) Foreign Application Priority Data

Jun. 24, 2013 (EP) .................................... 13173447

(51) Int. Cl.
*B64C 1/18* (2006.01)
*A44B 18/00* (2006.01)

(52) U.S. Cl.
CPC ............... *A44B 18/0069* (2013.01); *B64C 1/18* (2013.01); *Y10T 24/2767* (2015.01); *Y10T 29/49622* (2015.01)

(58) Field of Classification Search
CPC .. A44B 18/0069; B64C 1/18; Y10T 24/2767; Y10T 29/49622; B32B 2605/18; B32B 7/06; B32B 7/08; B32B 7/12; B32B 2305/08; B32B 2305/34; B32B 37/12
See application file for complete search history.

(56) References Cited

U.S. PATENT DOCUMENTS

| | | | | |
|---|---|---|---|---|
| 4,239,829 A | * | 12/1980 | Cohen | 428/86 |
| 6,264,412 B1 | * | 7/2001 | Nakamura et al. | 411/352 |
| 2008/0008521 A1 | * | 1/2008 | Naik | F16B 5/01 |
| | | | | 403/255 |
| 2008/0302060 A1 | | 12/2008 | Ciprian | |
| 2011/0183104 A1 | * | 7/2011 | Juergens | 428/116 |
| 2013/0125354 A1 | * | 5/2013 | Benthien | B29C 65/72 |
| | | | | 24/443 |
| 2013/0306794 A1 | * | 11/2013 | Zahlen | B64C 1/068 |
| | | | | 244/118.5 |

FOREIGN PATENT DOCUMENTS

| | | |
|---|---|---|
| DE | 102007062111 | 7/2009 |
| DE | 102010035787 | 3/2012 |
| DE | 102011101450 | 11/2012 |
| FR | 2891325 | 3/2007 |
| WO | 2012028263 | 3/2012 |

OTHER PUBLICATIONS

European Search Report, Nov. 18, 2013.

* cited by examiner

*Primary Examiner* — Patrick Maestri
(74) *Attorney, Agent, or Firm* — Greer, Burns & Crain Ltd.

(57) ABSTRACT

An aircraft structural component comprising a panel element made of a fiber reinforced composite material and provided with an opening extending fully through the panel element. A reinforcing element made of a fiber reinforced composite material has an opening extending through the reinforcing element from a first surface to a second surface of the reinforcing element. The opening extending through the reinforcing element is aligned with the opening extending through the panel element. A bushing extends through the opening provided in the panel element and the opening provided in the reinforcing element and is adapted to receive an attachment device for attaching a load to the aircraft structural component. A connecting element connects the reinforcing element to the panel element in a region of the panel element adjacent to the opening extending through the panel element by means of a hook and loop connection.

20 Claims, 6 Drawing Sheets

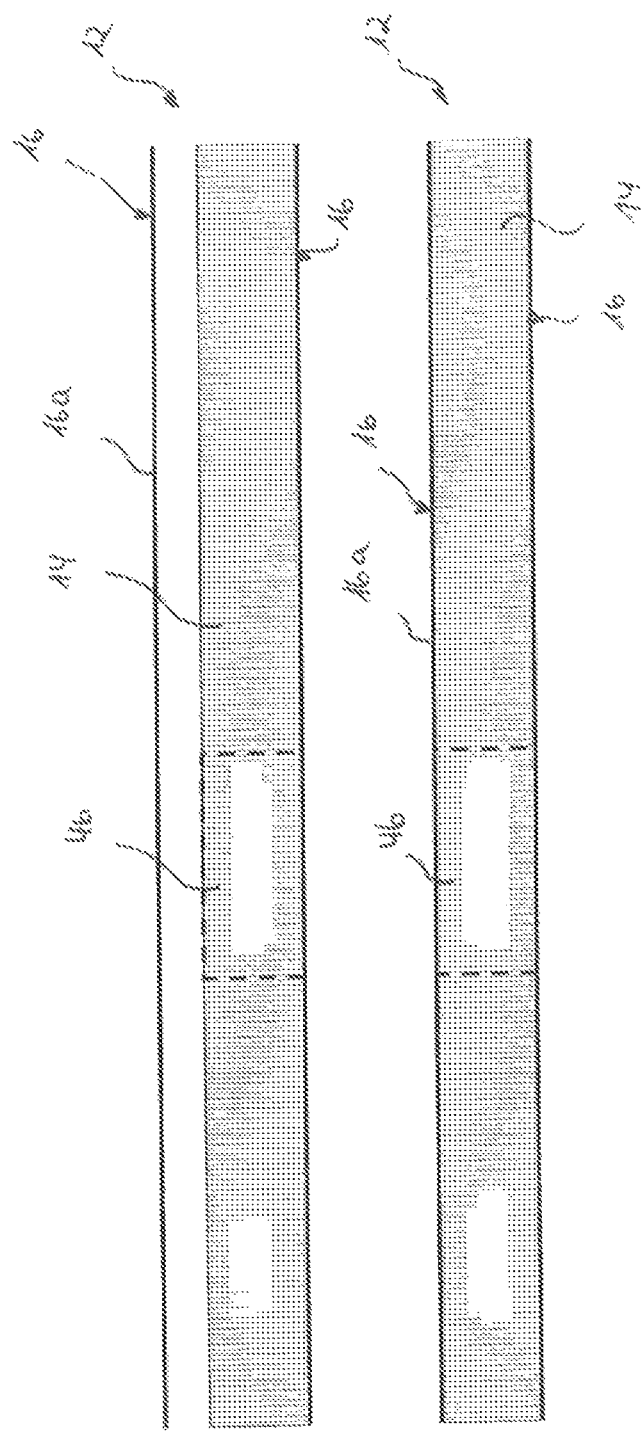

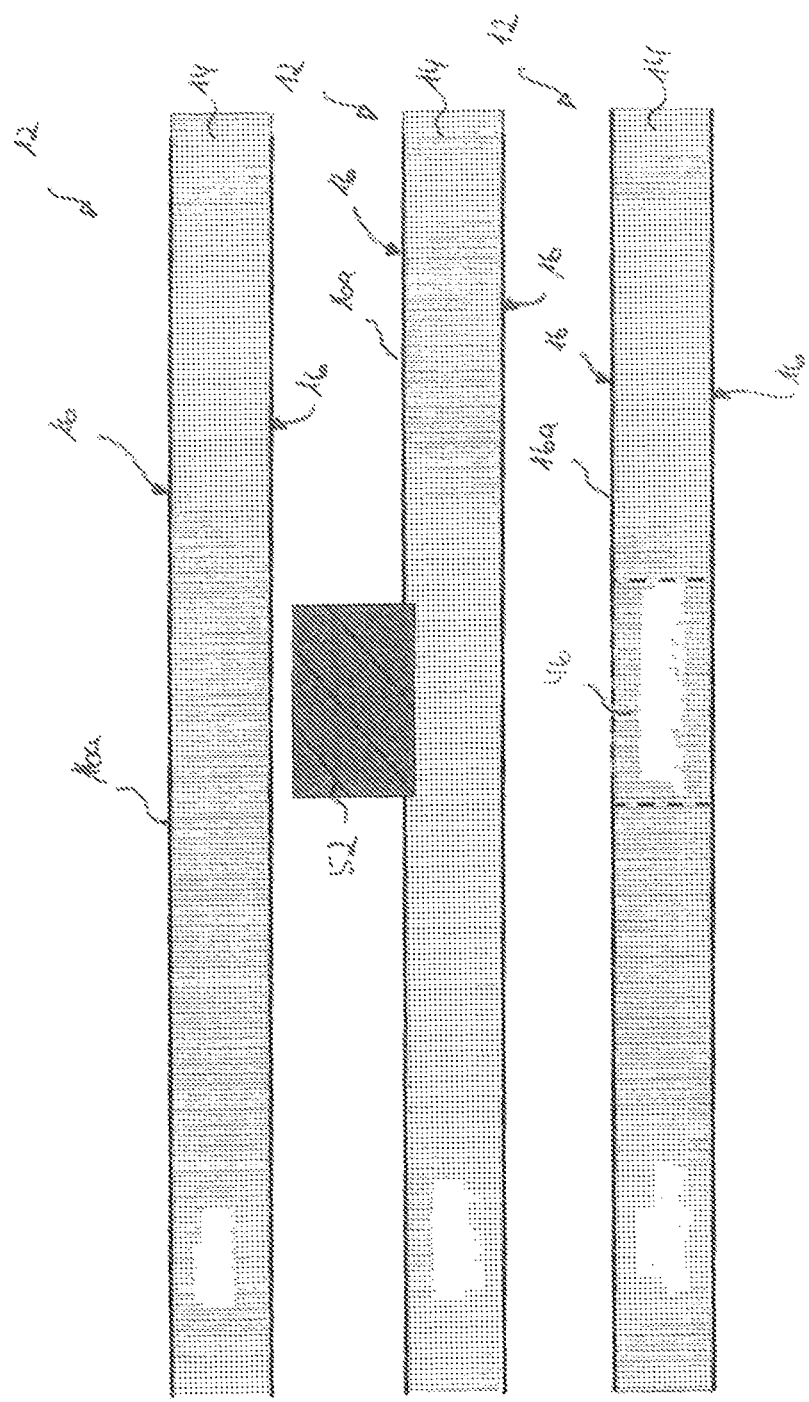

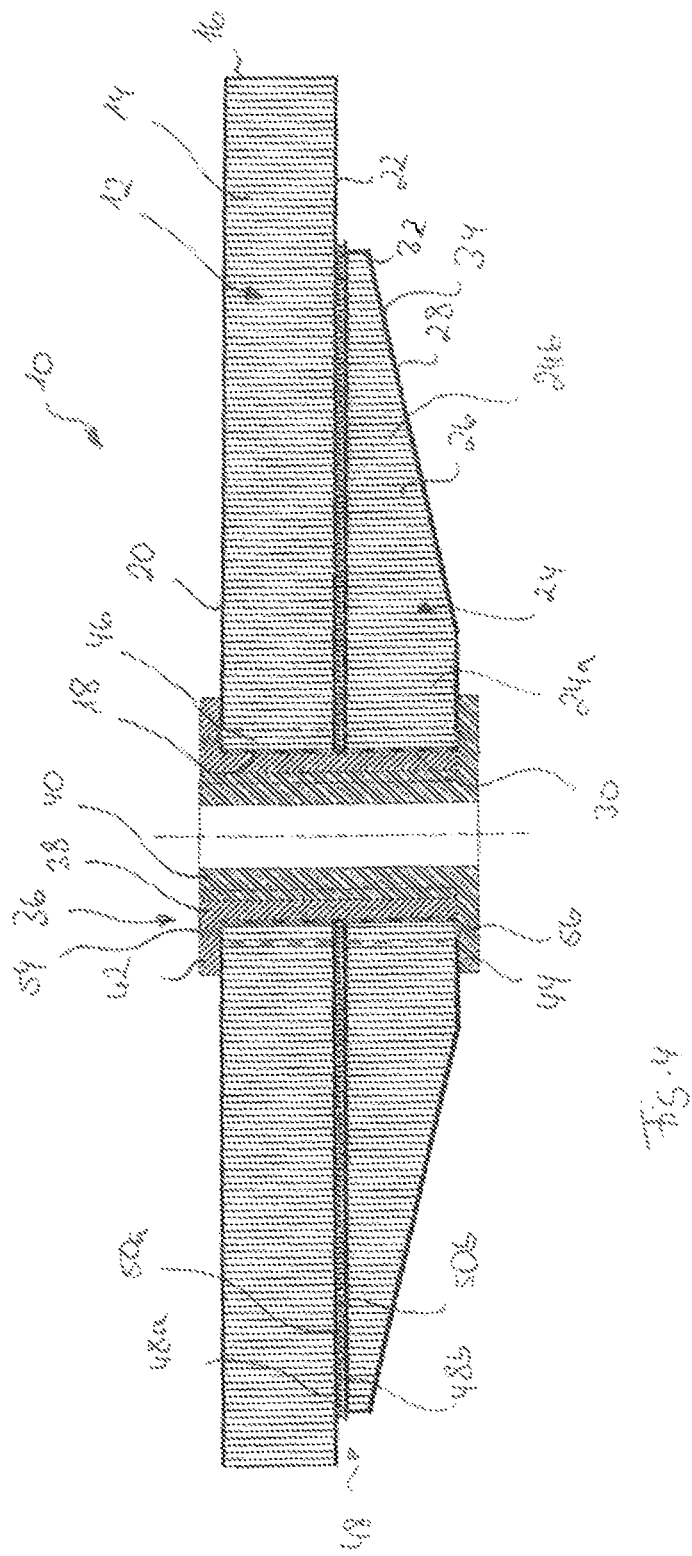

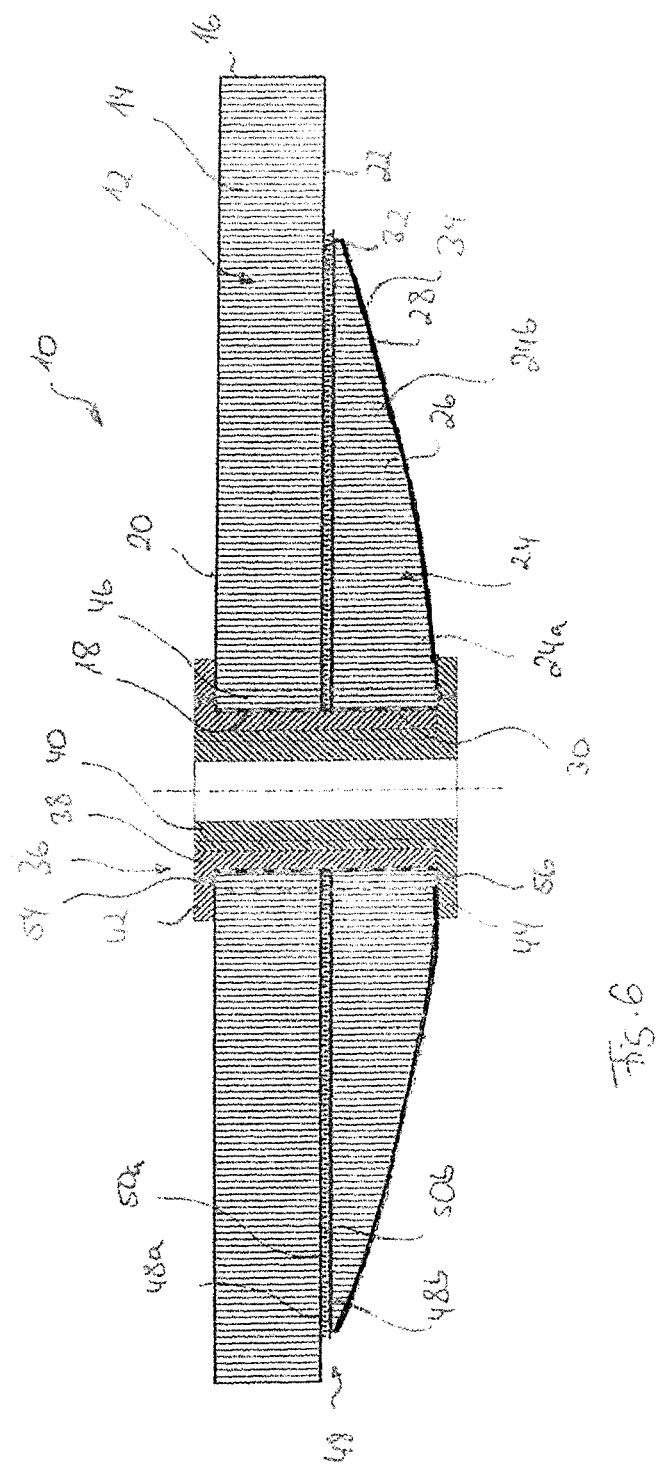

LOCALLY REINFORCED AIRCRAFT STRUCTURAL COMPONENT

CROSS-REFERENCES TO RELATED APPLICATIONS

This application claims the benefit of the European patent application No. 13 173 447.7 filed on Jun. 24, 2013, the entire disclosures of which are incorporated herein by way of reference.

BACKGROUND OF THE INVENTION

The invention relates to a locally reinforced aircraft structural component that is made in particular of a fiber-reinforced composite material. Further, the invention relates to a method of manufacturing an aircraft structural component of this kind.

In aircraft construction attempts are being made increasingly to use, as load-bearing components, components that are made entirely or partially from fiber-reinforced composite materials, for example carbon fiber-reinforced plastics (CFRP). For example, DE 10 2007 062 111 A1 describes a cross-beam structure made of a carbon fiber-reinforced plastics material, which is used to support the individual panels of an aircraft floor system for dividing a passenger cabin from a cargo compartment disposed underneath the passenger cabin.

Aircraft cabin monuments usually are attached to the floor system of the aircraft in the region of the cross-beams supporting the floor panels so as to provide for a secure fastening and support of the aircraft cabin monuments. However, in order to allow a more flexible cabin design independent of the location of the supporting cross-beams, aircraft floor panels may be locally reinforced and thus enabled to allow cabin monuments to be attached to the panels also in regions located between the cross-beams. For example, reinforcing elements may be integrated into a core of a floor panel as described, for example, in DE 10 2010 035 787 A1 and WO 2012/028263 A1. Alternatively, floor panels may be reinforced by symmetrically applying additional reinforcement layers to a top and a bottom surface of the panels. Finally, the aircraft floor system may be provided with a reinforcing secondary structure which is installed below the floor panels so as to locally support the floor panels in a region between the cross-beams.

SUMMARY OF THE INVENTION

The invention is directed at the object of specifying a locally reinforced aircraft structural component which has a low weight and is easy to manufacture, but at the same time also has a sufficient mechanical stability and stiffness to allow attachment and support of a load such as, for example, an aircraft cabin monument. Further, the invention is directed at the object of providing a method of manufacturing an aircraft structural component of this kind.

An aircraft structural component according to the invention comprises a panel element which is made of a fiber reinforced composite material. The aircraft structural component may be any aircraft component which is subjected to loads during operation. For example, the aircraft structural component may be shaped and dimensioned so as to be suitable to form a part of a floor installed in an aircraft. It is, however, also conceivable that the aircraft structural component is designed so as to be suitable to form another part of an aircraft's primary or secondary structure such as, for example, an aircraft outer skin section, a rib or a stringer. The panel element is provided with an opening extending through the panel element from a first surface to a second surface of the panel element.

The aircraft structural component further comprises a reinforcing element made of a fiber reinforced composite material. Preferably, the reinforcing element is smaller in size than the panel element. The reinforcing element then provides for a local reinforcement of the panel element without adding much weight. Hence, the aircraft structural component can be of a particularly light-weight design. The panel element and/or the reinforcing element may contain reinforcing fibers made of carbon which are present as short fibers or continuous fibers in the form of laid scrims or woven fabrics. Furthermore, other suitable fibers, such as, for example, glass fibers, may also be used. The fibers may be embedded in a matrix made of a plastic material, for example a thermoset plastic material, in particular an epoxy resin material. The reinforcing element is provided with an opening extending through the reinforcing element from a first surface to a second surface of the reinforcing element.

The opening extending through the reinforcing element is aligned with the opening extending through the panel element such that a bushing may extend through the opening provided in the panel element and the opening provided in the reinforcing element. The bushing is adapted to receive an attachment device for attaching a load to the aircraft structural component. The load may, for example, be a monument intended for installation in an aircraft cabin such as a galley, a separating wall, a lavatory or the like. The bushing thus defines an attachment point which allows the attachment of a load to the aircraft structural component which, at the attachment point, is locally reinforced by the reinforcing element. The aircraft structural component, at the attachment point, thus has a sufficient load bearing capacity which allows the attachment of a load independent of the location of supporting structure element such as aircraft floor panel supporting cross-beams. Hence, when used as a component of an aircraft floor system, the aircraft structural component allows a particularly flexible cabin design, since monument may be placed in the cabin independent of the location of the floor panel supporting cross-beams Finally, the aircraft structural component comprises a connecting element which connects the reinforcing element to the panel element in a region of the panel element adjacent to the opening extending through the panel element. The connecting element has a first section disposed on the second surface of the panel element which faces the first surface of the reinforcing element and a second section disposed on the first surface of the reinforcing element which faces the second surface of the panel element. Hence, the connecting element allows the reinforcing element to be fastened to the second surface of the panel element, while the first surface of the remains flat and unaffected by the presence of the reinforcing element.

The first section of the connecting element comprises a first plurality of hook and loop elements. Similarly, the second section of the connecting element comprises a second plurality of hook and loop elements. The first and the second plurality of hook and loop elements of the first and the second section of the connecting element are adapted to interact with each other so as to produce a hook and loop connection between the panel element and the reinforcing element. In other words, the hook and loop elements and in particular hook and loop heads of the hook and loop elements are designed such that the hook and loop elements of the first section of the connecting device can engage with the hook and loop elements of the second section of the connecting device in such a manner that a secure connection of the first section of the connecting device to the second section of the connecting device and hence of the first panel element to the reinforcing element is made possible. A connecting element which may be used to connect the panel element and the reinforcing element of the aircraft structural component is described in DE 10 2011 101 450 A1 and US 2013/125354 A1.

The panel element and the reinforcing element which are connected to one another by means of the connecting device by a hook and loop connection may be formed separately from one another and then connected at a desired location. Hence, a high flexibility in the design of the aircraft structural component in accordance with customer requirements is achieved, although a standard panel element may be used which may be reinforced at a desired location by the reinforcing element. Further, in particular in case the aircraft structural component is used as a component of an aircraft's floor system with the panel element forming a floor panel of the floor system, the panel element can be reinforced at a desired location without involvement of the aircraft's primary structure, eliminating the need to provide the primary structure with additional attachment/connecting points. Similarly, a secondary structure for supporting the panel element can be dispensed with eliminating the need to provide the panel element with additional attachment/connecting devices for connecting the panel element to the secondary structure.

The hook and loop elements of the first and the second section of the connecting device create, in the region of the interface between the panel element and the reinforcing element, a direct unyielding load path via which stresses acting on the panel element and the reinforcing element can be carried away. Through the hook and loop elements of the first and the second section of the connecting device, the interface between the panel element and the reinforcing element is thus endowed with a markedly higher rigidity than a pure adhesively bonded connection or a connection produced by joint curing of a panel element and a reinforcing element composed of a fiber-reinforced composite material. An interface produced by means of the connecting device between the panel element and the reinforcing element is therefore particularly peeling-stress-resistant. Consequently, the aircraft structural component is easy to manufacture, but also distinguished by a high failure resistance.

The reinforcing element may comprise a first portion surrounding the opening extending through the reinforcing element, i.e., a first portion which is disposed immediately adjacent to the opening. Further, the reinforcing element may comprise a second portion surrounding the first portion. Preferably, the second surface of the reinforcing element, in the region of the first portion of the reinforcing element, extends parallel to a flat first surface of the panel element. In other words, in the region of the first portion, the reinforcing element may have a flat second surface and a substantially constant thickness providing for a reliable reinforcement in a region close to the openings extending through the panel element and the reinforcing element. Further, the flat portion of the reinforcing element's second surface may form an abutment surface for a flange formed on the bushing thus allowing easy and reliable placement of the bushing. The second portion of the reinforcing element may have a thickness which decreases with increasing distance from the opening extending through the reinforcing element. The additional weight of the reinforcing element thus may be further reduced without significantly affecting the reinforcement effect of the reinforcing element.

The first surface of the panel element may be flat in order to be suitable to form a walkable floor surface when the aircraft structural component is used as a component of an aircraft's floor system with the panel element forming a floor panel of the floor system. A shape of the first surface of the reinforcing element may be adapted to a shape of the second surface of the panel element, thus allowing an easy and reliable connection of the reinforcing element to the panel element. In case the second surface of the panel element is flat, the first surface of the reinforcing element preferably also is flat. In case, however, the second surface of the panel element is curved, for example convexly curved relative to an imaginary central plane extending through the panel element in order to improve the impact resistance of the panel element, the first surface of the reinforcing element preferably is provided with a complementary curvature.

The second surface of the reinforcing element may be, at least in sections, convexly curved. In particular, the second surface of the reinforcing element may be, at least in sections, convexly curved relative to an imaginary central plane extending through the reinforcing element. A reinforcing element which is provided with a convexly curved second surface is particularly impact resistant.

The panel element may comprise a core and a surface layer. The core may be made of a foam material and/or may have a honeycomb structure. The surface layer may be made of a resin material and may cover only sections of the core or may entirely surround the core. A bonding film which is adapted to expand under elevated temperatures and/or which is adapted to seal the core against humidity and/or the surface layer material may be provided between the core and the surface layer. The surface layer may be connected to the core by curing, in particular cold curing. Similarly, the reinforcing element also may comprise a core and a surface layer, wherein the core may be made of a foam material and/or may have a honeycomb structure. The surface layer of the reinforcing element may be made of a resin material and may cover only sections of the core or may entirely surround the core. Finally, also in the reinforcing element, a bonding film may be present between the core and the surface layer which is adapted to expand under elevated temperatures and/or which is adapted to seal the core against humidity and/or the surface layer material. The surface layer of the reinforcing element may be connected to the core of the reinforcing element by curing, in particular cold curing.

In a region of the panel element adjacent to the opening extending through the panel element, the surface layer of the panel element may be formed by the first section of the connecting element. Similarly, at least in a region of the reinforcing element adjacent to the opening extending through the reinforcing element, the surface layer of the reinforcing element may be formed by the second section of the connecting element. The hook and loop elements of the first and/or the second section of the connecting element thus may extend from a carrier surface which is formed by a surface layer portion of the panel element and the reinforcing element, respectively.

The core of the panel element, in a region of the core adjacent to the opening extending through the panel element, may be filled with a core filler. Alternatively or additionally thereto the core of the reinforcing element, in a region of the core adjacent to the opening extending through the reinforcing element may be filled with a core filler. A core filler provides additional strength to the panel element and the reinforcing element, respectively, in their load bearing parts without adding too much additional weight.

The core filler may be a curable resin, in particular a cold curable resin. The core filler then may be introduced into the core of the panel element and/or the reinforcing element either prior to providing the core of the panel element and/or the reinforcing element with a surface layer or after removing a part of an already existing surface layer in liquid form and thereafter cured either separately or together with a surface layer of the panel element and/or the reinforcing element. Alternatively, the core filler may be provided in the form of a core portion made of a closed foam which is integrated into the core of the panel element and/or the reinforcing element.

Interspaces present between the hook and loop elements of the first section of the connecting element and the hook and loop elements of the second section of the connecting device may be filled with a sealing material. The sealing material may, for example, be a curable resin, in particular a cold curable resin. The introduction of a sealing material into interspaces present between the hook and loop elements of the first section of the connecting device and the hook and loop elements of the second section of the connection enables consolidation and strengthening of the connection between the hook and loop elements and hence the two sections of the connecting device. A further strengthening of this connection is made possible by curing the resin introduced into the interspaces between the hook and loop elements.

The bushing extending through the opening provided in the panel element and the opening provided in the reinforcing element may comprise an outer bushing element and an inner bushing element, wherein the outer bushing element and the inner bushing element may extend coaxially through the opening provided in the panel element and the opening provided in the reinforcing element. The outer bushing element may be fastened in its position in the opening provided in the panel element and the opening provided in the reinforcing element by means of a curable resin, in particular a cold curable resin. It is, however, also possible to fasten the outer bushing element in its position in the opening provided in the panel element and the opening provided in the reinforcing element by conventional gluing.

The outer bushing element may have an internal thread which interacts with an external thread of the inner bushing element in order to fasten the inner bushing element in its position in the opening provided in the panel element and the opening provided in the reinforcing element. The inner bushing element thus may be screwed into the out bushing in a comfortable and secure manner. The inner bushing element may be provided with an inner thread which allows an attachment device for attaching a load to the aircraft structural component such as, for example, a monument intended for installation in an aircraft cabin to be screwed into the inner bushing element. At least one of the inner and the outer bushing element may be provide with a radially extending flange which is adapted to abut against the first surface of the panel element and the second surface of the reinforcing element, respectively, in order to simplify the positioning of the inner bushing element and/or the outer bushing element in the opening provided in the panel element and the opening provided in the reinforcing element.

A method of manufacturing an aircraft structural component comprises the steps of providing a panel element made of a fiber reinforced composite material, and of providing a reinforcing element made of a fiber reinforced composite material. A bushing which is adapted to receive an attachment device for attaching a load to the aircraft structural component is inserted through an opening extending through the panel element from a first surface to a second surface of the panel element and through an opening extending through the reinforcing element from a first surface to a second surface of the reinforcing element, wherein the opening extending through the reinforcing element is aligned with the opening extending through the panel element. The reinforcing element is connected to the panel element in a region of the panel element adjacent to the opening extending through the panel element by means of a connecting element. The connecting element has a first section disposed on the second surface of the panel element which faces the first surface of the reinforcing element and comprising a first plurality of hook and loop elements and a second section disposed on the first surface of the reinforcing element which faces the second surface of the panel element and comprising a second plurality of hook and loop elements. The first and the second plurality of hook and loop elements of the first and the second section of the connecting element interact with each other so as to produce a hook and loop connection between the panel element and the reinforcing element.

The panel element may comprise a core and a surface layer connected to the core by curing, wherein in a region of the panel element adjacent to the opening extending through the panel element, the surface layer of the panel element may be formed by the first section of the connecting element. Similarly, the reinforcing element may comprise a core and a surface layer connected to the core by curing, wherein at least in a region of the reinforcing element adjacent to the opening extending through the reinforcing element, the surface layer of the reinforcing element may be formed by the second section of the connecting element.

The core of the panel element, in a region of the core intended to be located adjacent to the opening extending through the panel element, may be filled with a core filler. Similarly, the core of the reinforcing element, in a region of the core intended to be located adjacent to the opening extending through the reinforcing element, may filled with a core filler. The core filler may be a curable resin, in particular a cold curable resin. The core filler may be introduced into the core of the panel element and the reinforcing element, respectively, prior to forming the opening extending through the panel element and the reinforcing element, respectively. It is, however, also conceivable to first form the opening extending through the panel element and the reinforcing element, respectively, and to introduce the core filler thereafter.

Further, the core filler may be introduced into the core of the panel element and/or the reinforcing element prior to or after the insertion of the bushing into the opening provided in the panel element and the opening provided in the reinforcing element. In case the core filler should be introduced into the core of the panel element and/or the reinforcing element after the insertion of the bushing into the opening provided in the panel element and the opening provided in the reinforcing element, the core filler may be injected through at least one channel provided in at least one flange of the bushing which abuts against the first surface of the panel element and/or the second surface of the reinforcing element.

In a first alternative, the surface layer of the panel element and the core filler introduced into the panel element may be cured simultaneously. For example, the core filler may be introduced into the panel element and the surface layer may be applied to the core preferably after introducing the core filler. The curing of the core filler and the surface layer then may be achieved in a single step. This procedure is particularly suitable for manufacturing standard panel elements, wherein the location of the opening extending through the panel element already is known in a time saving manner.

Similarly, the surface layer of the reinforcing element and the core filler introduced into the reinforcing element may be cured simultaneously.

In a second alternative, in a first step, the surface layer of the panel element may be cured. Thereafter, in a second step, the surface layer of the panel element, in a region of the core intended to be located adjacent to the opening extending through the panel element, may be removed. In a third step, the core filler may be introduced into the panel element, and, in a fourth step, the core filler may be cured. Similarly, in a first step, the surface layer of the reinforcing element may be cured. In a second step, the surface layer of the reinforcing element, in a region of the core intended to be located adjacent to the opening extending through the reinforcing element, may be removed. In a third step the core filler may be introduced into the reinforcing element, and, in a fourth step, the core filler may be cured. The locally restricted removal of the surface layer of the panel element and the reinforcing element, respectively, may be achieved prior to forming the opening extending through the panel element and the reinforcing element, respectively. It is, however, also conceivable to first form the opening extending through the panel element and the reinforcing element, respectively, and to achieve the locally restricted removal of the surface layer thereafter. This procedure is particularly suitable for repairing or individually designing a pre-manufactured standard panel element and/or standard reinforcing element.

The core filler introduced into the panel element and the core filler introduced into the reinforcing element may be cured simultaneously. Further, it is conceivable to simultaneously cure the surface layer of the panel element and the surface layer of the reinforcing element, wherein the curing of the surface layer of the panel element and the surface layer of the reinforcing element may be achieved simultaneously with the curing of a core filler introduced into the panel element and/or the reinforcing element.

Interspaces present between the hook and loop elements of the first section of the connecting element and the hook and loop elements of the second section of the connecting device may be filled with a sealing material, the sealing material preferably being a resin, in particular a curable resin. The sealing material may be cured simultaneously with a core filler introduced into the panel element and/or the reinforcing element and/or a surface layer of the panel element and/or the reinforcing element.

The opening extending through the panel element and the opening extending through the reinforcing element may be introduced into the panel element and the reinforcing element which are connected to each other by means of the connecting element. Hence, the opening extending through the panel element and the opening extending through the reinforcing element are formed in a single step. A step of aligning already present opening in the panel element and the reinforcing element may be dispensed with. The opening extending through the panel element and the opening extending through the reinforcing element may be formed by drilling.

An outer bushing element of the bushing may have an internal thread and may be fastened in its position in the opening provided in the panel element and the opening provided in the reinforcing element by means of a curable resin, in particular a cold curable resin. An inner bushing element of the bushing may have an external thread and may be fastened in its position in the opening provided in the panel element and the opening provided in the reinforcing element by screwing the inner bushing element into the outer bushing element.

BRIEF DESCRIPTION OF THE DRAWINGS

Preferred embodiments of the invention now described in greater detail with reference to the accompanying schematic drawings, wherein FIGS. 2a and 2b show a first method of introducing a core filler into a core of a panel element forming part of the aircraft structural component depicted in FIG. 1, FIGS. 3a to 3c show a second method of introducing a core filler into a core of a panel element forming part of the aircraft structural component depicted in FIG. 1, FIG. 4 shows a third method of introducing a core filler into a core of a panel element forming part of the aircraft structural component depicted in FIG. 1, FIGS. 5a and 5b show a method of forming openings in a panel element and a reinforcing element forming parts of the aircraft structural component depicted in FIG. 1, FIG. 6 shows a reinforcing element with a convexly curved second surface.

DETAILED DESCRIPTION OF THE PREFERRED EMBODIMENTS

Figure 1:
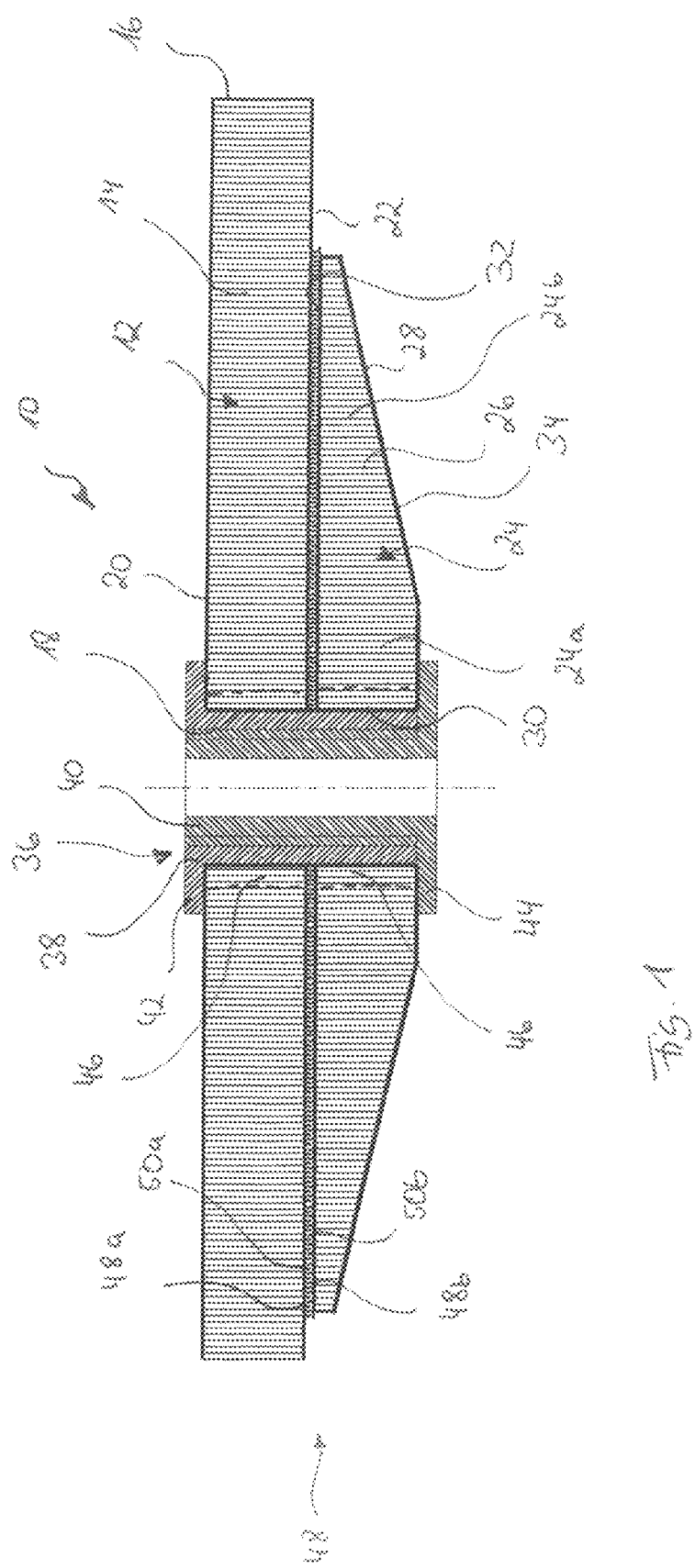
FIG. 1 shows an aircraft structural component which is suitable for use as a component of an aircraft floor system.

FIG. 1 shows an aircraft structural component 10 which is suitable for use as a component of an aircraft floor system. The aircraft structural component 10 comprises a panel element 12 which is made of a fiber reinforced composite material. In particular, the panel element 12 comprises a core 14 and a surface layer 16. In the embodiment of an aircraft structural component 10 depicted in FIG. 1, the core 14 is made of a foam material and has a honeycomb structure. The surface layer 16 is made of a cold curable resin. An opening 18 extends through the panel element 12 from a first surface 20 to a second surface 22 of the panel element 12.

When the aircraft structural component 10 is mounted in an aircraft the flat first surface 20 of the panel element 12 forms a walkable floor surface. In the embodiment of an aircraft structural component 10 depicted in FIG. 1, the second surface 22 of the panel element 12 also is flat and extends substantially parallel to the flat first surface 20. It is, however, also conceivable to provide the panel element 12 with a curved second surface 22. For example, the second surface 22 of the panel element 12 may be, at least in sections, convexly curved relative to an imaginary central plane extending through the panel element 12 in order to improve the impact resistance of the panel element 12.

The aircraft structural component 10 further comprises a reinforcing element 24 which also is made of a fiber reinforced composite material. Like the panel element 12, the reinforcing element 24 comprises a core 26 and a surface layer 28, wherein the core 26 is made of a foam material and has a honeycomb structure, and wherein the surface layer 28 is made of a cold curable resin. An opening 30 which is aligned with the opening 18 provided in the panel element 12 extends through the reinforcing element 24 from a first surface 32 to a second surface 34 of the reinforcing element 34. Since the reinforcing element 24 is smaller in size than the panel element 12, the reinforcing element 24 provides for a local reinforcement of the panel element 12 without adding much weight and volume.

In the embodiment of an aircraft structural component 10 depicted in FIG. 1, the first surface 32 of the reinforcing element 24 has a flat shape which is adapted to the flat shape of the second surface 22 of the panel element 12, thus allowing an easy and reliable connection of the reinforcing element 24 to the panel element 12. If, however, the second surface 22 of the panel element 12 is curved, the first surface 32 of the reinforcing element 24 may be provided with a complementary curvature.

The reinforcing element 24 comprises a first portion 24a surrounding the opening 30 extending through the reinforcing element 24 and a second portion 24b surrounding the first portion 24a. In the region of the first portion 24a of the reinforcing element 24, the second surface 34 of the reinforcing element 24 extends substantially parallel to the flat first surface 20 of the panel element 12 such that the first portion 24a of the reinforcing element 24 has a constant thickness. Contrary thereto, the second portion 24b of the reinforcing element 24 has a thickness which decreases with increasing distance from the opening 30 extending through the reinforcing element 24. In the embodiment of an aircraft structural component 10 depicted in FIG. 1, in the second portion 24b of the reinforcing element 24, the second surface 34 of the reinforcing element 24 is continuously inclined relative to an imaginary central plane extending through the reinforcing element 24. It is, however, also conceivable to provide the reinforcing element 24 with a curved second surface 34. For example, the second surface 34 of the reinforcing element 24 may be, at least in sections, convexly curved relative to an imaginary central plane extending through the reinforcing element 24 in order to improve the impact resistance of the reinforcing element 24 (FIG. 6).

A bushing 36 which is adapted to receive an attachment device for attaching a load, for example, a monument intended for installation in an aircraft cabin such as a galley, a separating wall, a lavatory or the like to the aircraft structural component 10 extends through the opening 18 provided in the panel element 12 and the opening 30 provided in the reinforcing element 24.

The bushing 36 comprises an outer bushing element 38 and an inner bushing element 40 which extend coaxially through the opening 18 provided in the panel element 12 and the opening 30 provided in the reinforcing element 24. The outer bushing element 38 is fastened in its position in the opening 18 provided in the panel element 12 and the opening 30 provided in the reinforcing element 24 by means of a cold curable resin. Further, the outer bushing element 38 has an internal thread which interacts with an external thread of the inner bushing element 40 in order to fasten the inner bushing element 40 in its position in the opening 18 provided in the panel element 12 and the opening 30 provided in the reinforcing element 24.

The inner bushing element 40 also is provided with an inner thread which allows the attachment device for attaching a load to the aircraft structural component to be screwed into the inner bushing element 40. Both, the outer and the inner bushing element 38, 40 are provided with a radially extending flange 42, 44. The flange 42 of the outer bushing element 38 abuts against the first surface 20 of the panel element 12 and the flange 44 of the outer bushing element 40 abuts and the second surface 34 of the reinforcing element 24.

The cores 14, 26 of the panel element 12 and the reinforcing element 24, in a region of the cores 14, 26 adjacent to the openings 18, 30 extending through the panel element 12 and the reinforcing element 24, respectively, are filled with a core filler 46 which provides additional strength to the panel element 12 and the reinforcing element 24. The core filler 46 is a cold curable resin which is introduced into the cores 14, 26 of the panel element 12 and the reinforcing element 24 as discussed in more detail below.

Finally, the aircraft structural component 10 comprises a connecting element 48 which connects the reinforcing element 24 to the panel element 12 in a region of the panel element 12 adjacent to the opening 18 extending through the panel element 12. The connecting element 48 has a first section 48a disposed on the second surface 22 of the panel element 12 which faces the first surface 32 of the reinforcing element 24. In particular, the first section 48a of the connecting element 48 forms a part of the surface layer 16 applied onto the core 14 of the panel element 12. A second section 48b of the connecting element 48 is disposed on the first surface 32 of the reinforcing element 24 which faces the second surface 22 of the panel element 12. In particular, the second section 48b of the connecting element 48 forms a part of the surface layer 38 applied onto the core 26 of the reinforcing element 24.

The first section 48a of the connecting element 48 comprises a first plurality of hook and loop elements 50a. Similarly, the second section 48b of the connecting element 48 comprises a second plurality of hook and loop elements 50b. The first and the second plurality of hook and loop elements 50a, 50b of the first and the second section 48a, 48b of the connecting element 48 are adapted to interact with each other so as to produce a hook and loop connection between the panel element 12 and the reinforcing element 24. Interspaces present between the hook and loop elements 50a of the first section 48a of the connecting element 48 and the hook and loop elements 50b of the second section 48b of the connecting device 48 are filled with a sealing material which is provided in the form of a cold curable resin. A connecting element 48 which may be used to connect the panel element 12 and the reinforcing element 24 of the aircraft structural component 10 is described in DE 10 2011 101 450 A1 and US 2013/125354 A1.

FIGS. 2a and 2b show a first method of introducing the core filler 46 into the core 14 of the panel element 12. As becomes apparent from FIG. 2a, the core filler 46 may be introduced into the core 14 of the panel element 12 prior to forming the opening 18 extending through the panel element 12 and prior to applying a top section 16a of the surface layer 16 onto the core 14. After introducing the core filler 46 into the core 14 of the panel element 12, the top section 16a of the surface layer 16 may be placed onto the core 14 and the core filler 46 and the surface layer 16 may be cures simultaneously.

In an alternative method depicted in FIGS. 3a to 3c, a core filler 46 is introduced into an already finished panel element 12, i.e., a panel element 12 which first is provided with a surface layer 14, wherein the surface layer 14 may be cured (see FIG. 3a). In a second step shown in FIG. 3b, the surface layer 14 of the panel element 12, in a region of the core 14 intended to be located adjacent to the opening 18 extending through the panel element 12, is removed by means of a cutter 52. In a third step depicted in FIG. 3c, the core filler 46 is introduced into the panel element 12, and thereafter may be cured.

Further, as shown in FIG. 4, it is also conceivable to introduce the core filler 46 into the cores 14, 26 of the panel element 12 and the reinforcing element 24 after the insertion of the bushing 36 into the opening 18 provided in the panel element 12 and the opening 30 provided in the reinforcing element 24. Specifically, the core filler 46 may be injected through channels 54, 56 provided in the flanges 42, 44 of the outer and the inner bushing element 38, 40. The core filler 46 introduced into the panel element 12 and the core filler 46 introduced into the reinforcing element 24 then may be cured simultaneously.

Figure 5A:
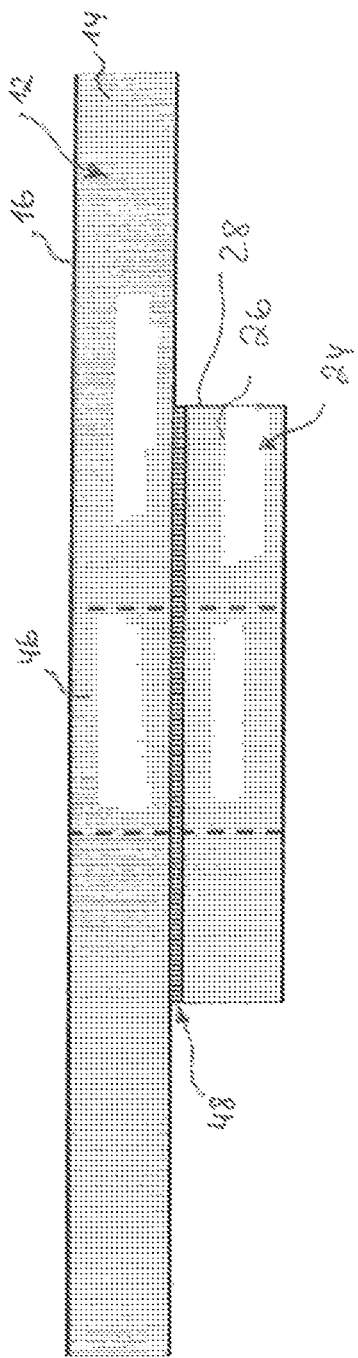
Figure 5B:
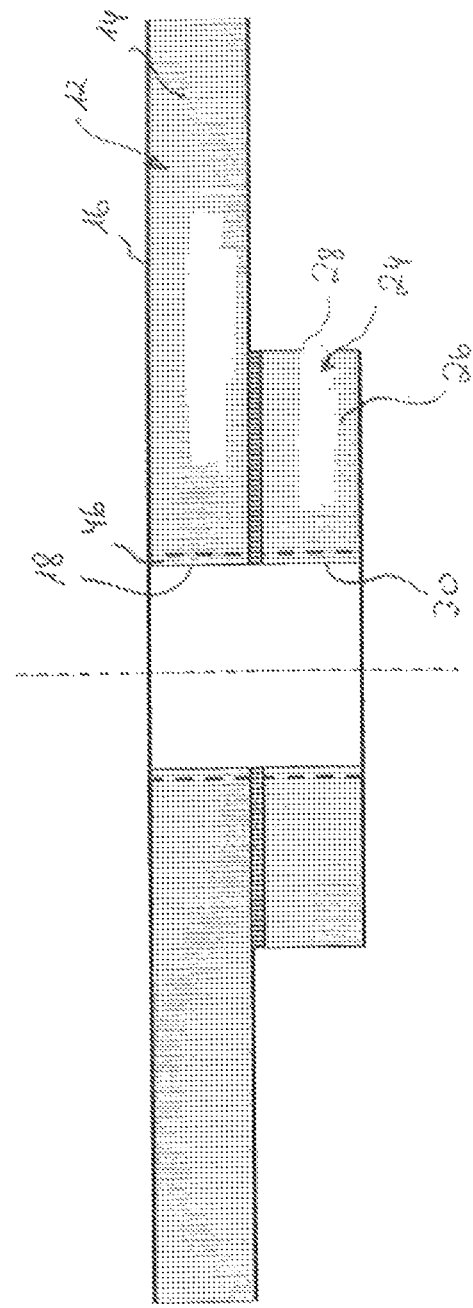

FIGS. 5a and 5b finally show a method of forming the openings 18, 30 in the panel element 12 and the reinforcing element 24. First, the panel element 12 and the reinforcing element 24 are connected to each other by means of the connecting element 48. Thereafter, the core filler 46 is introduced into the cores 14, 26 of the panel element 12 and the reinforcing element 24 and cured. Finally, the opening 18 extending through the panel element 12 and the opening 30 extending through the reinforcing element 24 are introduced into the panel element 12 and the reinforcing element 24 which are connected to each other by drilling.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft structural component, comprising:
    a panel element made of a fiber reinforced composite material and being provided with an opening extending through the panel element from a first surface to a second surface of the panel element,
    a reinforcing element made of a fiber reinforced composite material and being provided with an opening extending through the reinforcing element from a first surface to a second surface of the reinforcing element, the opening extending through the reinforcing element being aligned with the opening extending through the panel element,
    a bushing extending through the opening provided in the panel element and the opening provided in the reinforcing element and being configured to receive an attachment device for attaching a load to the aircraft structural component, and
    a connecting element which connects the reinforcing element to the panel element in a region of the panel element adjacent to the opening extending through the panel element, the connecting element having a first section disposed on the second surface of the panel element which faces the first surface of the reinforcing element and comprising a first plurality of hook and loop elements and a second section disposed on the first surface of the reinforcing element which faces the second surface of the panel element and comprising a second plurality of hook and loop elements,
    wherein the first and the second plurality of hook and loop elements of the first and the second section of the connecting element are adapted to interact with each other so as to produce a hook and loop connection between the panel element and the reinforcing element, and
    wherein the panel element comprises a core comprising at least one of a foam material or a honeycomb structure which, in a region of the core directly adjacent to the opening extending through the panel element, has interior spaces of the at least one of the foam material or honeycomb structure of the core which are filled with a core filler.

2. The aircraft structural component according to claim 1, including at least one of:
    the reinforcing element comprising a first portion surrounding the opening extending through the reinforcing element and a second portion surrounding the first portion,
    the second surface of the reinforcing element, in the region of the first portion of the reinforcing element, extending parallel to a flat first surface of the panel element, and the second portion having a thickness which decreases with increasing distance from the opening extending through the reinforcing element.

3. The aircraft structural component according to claim 1, wherein a shape of the first surface of the reinforcing element is adapted to a shape of the second surface of the panel element.

4. The aircraft structural component according to claim 1, wherein the second surface of the reinforcing element, at least in sections, is convexly curved.

5. The aircraft structural component according to claim 1, wherein the panel element comprises a surface layer connected to the core by curing, wherein in a region of the panel element adjacent to the opening extending through the panel element, the surface layer is formed by the first section of the connecting element.

6. The aircraft structural component according to claim 1, wherein the reinforcing element comprises a surface layer connected to the core by curing, wherein at least in a region of the reinforcing element adjacent to the opening extending through the reinforcing element, the surface layer is formed by the second section of the connecting element.

7. The aircraft structural component according to claim 6, wherein the core of the reinforcing element comprises at least one of a foam material or a honeycomb structure and in a region of the core adjacent to the opening extending through the reinforcing element, has interior spaces of the at least one of the foam material or honeycomb structure which are filled with a core filler.

8. The aircraft structural component according to claim 1, wherein interspaces present between the hook and loop elements of the first section of the connecting element and the hook and loop elements of the second section of the connecting device are filled with a sealing material.

9. The aircraft structural component according to claim 1, wherein the bushing comprises an outer bushing element and an inner bushing element, the outer bushing element being fastened in its position in the opening provided in the panel element and the opening provided in the reinforcing element by means of a curable resin and having an internal thread interacting with an external thread of the inner bushing element in order to fasten the inner bushing element in its position in the opening provided in the panel element and the opening provided in the reinforcing element.

10. A method of manufacturing an aircraft structural component, the method comprising:
    providing a panel element made of a fiber reinforced composite material,
    providing a reinforcing element made of a fiber reinforced composite material,
    inserting a bushing which is adapted to receive an attachment device for attaching a load to the aircraft structural component through an opening extending through the panel element from a first surface to a second surface of the panel element and through an opening extending through the reinforcing element from a first surface to a second surface of the reinforcing element, the opening extending through the reinforcing element being aligned with the opening extending through the panel element, and
    connecting the reinforcing element to the panel element in a region of the panel element adjacent to the opening extending through the panel element by means of a connecting element having a first section disposed on the second surface of the panel element which faces the first surface of the reinforcing element and comprising a first plurality of hook and loop elements and a second section disposed on the first surface of the reinforcing element which faces the second surface of the panel element and comprising a second plurality of hook and loop elements, wherein the first and the second plurality of hook and loop elements of the first and the second section of the connecting element interact with each other so as to produce a hook and loop connection between the panel element and the reinforcing element, and wherein the panel element comprises a core comprising at least one of a foam material or a honeycomb structure which, in a region of the core intended to be located directly adjacent to the opening extending through the panel element, has interior spaces of the at least one of the foam material or honeycomb structure of the core which are filled with a core filler.

11. The method according to claim 10, wherein at least one of the panel element comprises a surface layer connected to the core by curing, wherein in a region of the panel element adjacent to the opening extending through the panel element, the surface layer is formed by the first section of the connecting element, and the reinforcing element comprises a core and a surface layer connected to the core by curing, wherein at least in a region of the reinforcing element adjacent to the opening extending through the reinforcing element, the surface layer is formed by the second section of the connecting element.

12. The method according to claim 11, wherein the core of the reinforcing element comprises at least one of a foam material or a honeycomb structure, and in a region of the core intended to be located adjacent to the opening extending through the reinforcing element, has interior spaces of the at least one of the foam material or honeycomb structure of the core which are filled with a core filler.

13. The method according to claim 11, wherein the surface layer of the panel element and the core filler introduced into the panel element are cured simultaneously, and wherein the surface layer of the reinforcing element and the core filler introduced into the reinforcing element are cured simultaneously.

14. The method according to claim 11, wherein, in a first step, the surface layer of the panel element is cured, in a second step, the surface layer of the panel element, in a region of the core intended to be located adjacent to the opening extending through the panel element, is removed, in a third step the core filler is introduced into the panel element, and, in a fourth step, the core filler is cured, and wherein, in a first step, the surface layer of the reinforcing element is cured, in a second step, the surface layer of the reinforcing element, in a region of the core adjacent to the opening extending through the reinforcing element, is removed, in a third step the core filler is introduced into the reinforcing element, and, in a fourth step, the core filler is cured.

15. The method according to claim 11, wherein the core filler introduced into the panel element and the core filler introduced into the reinforcing element are cured simultaneously.

16. The method according to claim 10, wherein interspaces present between the hook and loop elements of the first section of the connecting element and the hook and loop elements of the second section of the connecting device are filled with a sealing material.

17. The method according to claim 10, wherein the opening extending through the panel element and the opening extending through the reinforcing element are introduced into the panel element and the reinforcing element which are connected to each other by means of the connecting element by drilling.

18. The method according to claim 10, wherein an outer bushing element of the bushing has an internal thread and is fastened in its position in the opening provided in the panel element and the opening provided in the reinforcing element by means of a curable resin, and an inner bushing element of the bushing has an external thread and is fastened in its position in the opening provided in the panel element and the opening provided in the reinforcing element by screwing the inner bushing element into the outer bushing element.

19. The aircraft structural component according to claim 9, wherein the outer bushing element extends from at least the first surface of the panel element to the second surface of the reinforcing element, and the inner bushing extends from at least the second surface of the reinforcing element to the first surface of the panel element.

20. An aircraft structural component, comprising:

a panel element made of a fiber reinforced composite material and being provided with an opening extending through the panel element from a first surface to a second surface of the panel element, a reinforcing element made of a fiber reinforced composite material and being provided with an opening extending through the reinforcing element from a first surface to a second surface of the reinforcing element, the opening extending through the reinforcing element being aligned with the opening extending through the panel element, a bushing extending through the opening provided in the panel element and the opening provided in the reinforcing element and being adapted to receive an attachment device for attaching a load to the aircraft structural component, and a connecting element which connects the reinforcing element to the panel element in a region of the panel element adjacent to the opening extending through the panel element, the connecting element having a first section disposed on the second surface of the panel element which faces the first surface of the reinforcing element and comprising a first plurality of hook and loop elements and a second section disposed on the first surface of the reinforcing element which faces the second surface of the panel element and comprising a second plurality of hook and loop elements, wherein the first and the second plurality of hook and loop elements of the first and the second section of the connecting element are adapted to interact with each other so as to produce a hook and loop connection between the panel element and the reinforcing element, and wherein the bushing comprises a first flange disposed on the first surface of the panel element and a second flange disposed on the second surface of the reinforcing structure, and wherein the panel element comprises a core comprising at least one of a foam material and a honeycomb structure which has interior spaces which are filled with a core filler in a region of the core directly adjacent to the opening extending through the panel element, via channels provided in at least one of the first flange and second flange.

\* \* \* \* \*